United States Patent [19]

Voll

[11] 4,273,229
[45] Jun. 16, 1981

[54] ELASTIC MOUNTING FOR HIGH-SPEED ROTOR

[75] Inventor: Horst Voll, Hassfurt, Fed. Rep. of Germany

[73] Assignee: Kugelfischer Georg Schäfer & Co., Schweinfurt, Fed. Rep. of Germany

[21] Appl. No.: 39,779

[22] Filed: May 17, 1979

[30] Foreign Application Priority Data

May 20, 1978 [DE] Fed. Rep. of Germany ....... 2822108

[51] Int. Cl.³ ............................................. F16D 43/24
[52] U.S. Cl. ........................... 192/105 CF; 192/93 C; 192/79; 192/99 B; 64/1 V; 64/15 C; 57/76
[58] Field of Search .................. 192/93 C, 79, 103 B, 192/103 R, 99 B, 110 R, 110 B, 110 S, 104 C, 105 CF; 64/1 R, 1 S, 1 V, 15 C, 27 C, 30 C, 30 D, 30 E; 308/26; 57/76, 130, 134, 135

[56] References Cited

U.S. PATENT DOCUMENTS

| 2,889,695 | 6/1959 | Moeller | 64/1 V |
| 3,045,790 | 7/1962 | Becker | 192/93 R |
| 3,075,406 | 1/1963 | Butler et al. | 64/1 V |
| 3,131,797 | 5/1964 | Bochan | 192/103 R |
| 3,950,964 | 4/1976 | Alexeeva et al. | 64/1 V |

*Primary Examiner*—George H. Krizmanich
*Attorney, Agent, or Firm*—Karl F. Ross

[57] ABSTRACT

A mounting for a shaft of a tool rotating at high speed comprises a rotatably journaled tube with an axial bore of a diameter exceeding that of the tool shaft. The latter is held in that bore by resilient inserts, such as soft springs or O-rings, whose elasticity coefficient is so chosen that the shaft has a critical speed well below the operating speed of the tool. A locking device, preferably actuated automatically by a speed sensor, consolidates the shaft with the tube until the system surpasses the critical speed.

8 Claims, 2 Drawing Figures

ELASTIC MOUNTING FOR HIGH-SPEED ROTOR

FIELD OF THE INVENTION

My present invention relates to a mounting for a shaft of a high-speed rotary tool such as, for example, a spinning pot or a spindle for the truing of grindstones.

BACKGROUND OF THE INVENTION

As is well known, shafts rotating at or near their critical speeds give rise to considerable radial stresses which must be absorbed by their bearings. This is particularly true when the tool carried by the shaft is cantilevered thereon without counterbearing, as is the case with the devices referred to above. Various proposals have been made for reducing these radial stresses, generally through the use of elastic inserts. Thus, it has been proposed to interpose spacers of synthetic rubber between the outer race of a journal bearing and the stationary housing in which that bearing is held. Such a mounting, while mitigating the effects of vibrations due to the radial stresses, does not eliminate their causes, namely the noncoincidence of the axis of rotation with the inertial axis of the rotary body constituted by the tool and its shaft.

German published application No. 1,966,463 discloses acoustic dampers interposed between a high-speed rotor and its ball bearings. According to that publication, the acoustic dampers are several elastic O-rings with a Shore hardness of about 90 which are to be stiff enough to hold the rotor in its substantially centered position. With such a mounting, too, there occurs only a minor reduction of the stresses due to eccentricity.

OBJECT OF THE INVENTION

The object of my present invention, therefore, is to provide an improved mounting for a rotary body operating at high speed.

SUMMARY OF THE INVENTION

A mounting according to my present invention comprises a rotatably journaled elongate tubular element whose axial bore has a diameter substantially exceeding that of the shaft of the rotary body to be received therein, that shaft being supported in the bore by elastic inserts in substantially coaxial relationship with the tubular element at a plurality of axially spaced locations. These inserts, acting as coupling means, are sufficiently yieldable to allow limited radial excursions of the shaft from a coaxial position during rotation of the tubular element at an operating speed substantially higher than the critical speed $V_c$ determined by the moment of inertia and the modulus of elasticity of the rotary body and the inserts.

When driven at its above-critical operating speed $V_o$, the shaft tends to assume a position in which its axis of rotation coincides with its inertial axis. The more these two axes coincide, i.e. the higher the operating speed $V_o$ lies above the critical speed $V_c$, the less are the unbalancing stresses which act upon the journal bearings through the interposed tubular element. I have found that, in many instances, an operating speed exceeding the critical speed by about 50% is satisfactory.

In accelerating the rotary body to its operating speed, vibrations could still become excessive as that speed passes through the critical level. I therefore prefer to provide the mounting according to my invention with locking means for relatively immobilizing the shaft and the tubular element at the critical speed $V_c$ of the rotary body. Since the moment of inertia and the modulus of elasticity of the consolidated unit differ from those of the elastically supported rotary body, the critical speed of that unit will lie in a different range. If that range is above the normal critical speed $V_c$ of the body, the locking means may be made effective from standstill until the driving speed surpasses the value $V_c$. Otherwise, the locking means may be activated just below and released just above the critical speed $V_c$. The activation and deactivation advantageously occurs automatically under the control of a speed sensor.

BRIEF DESCRIPTION OF THE DRAWING

These and other features of my invention will now be described in detail with reference to the accompanying drawing in which.

SPECIFIC DESCRIPTION

Figure 1:
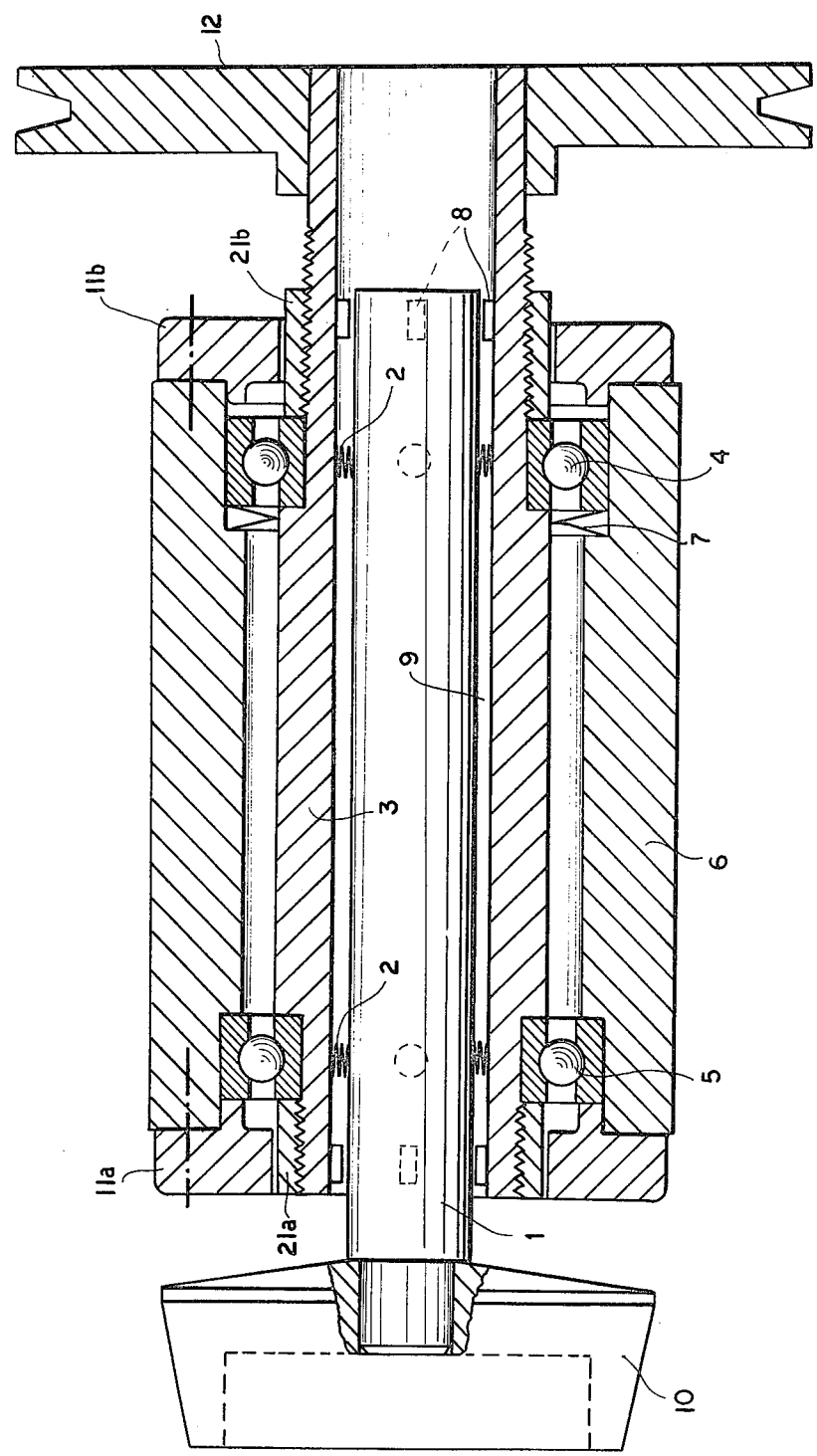
FIG. 1 is an axial sectional view of a mounting for a high-speed rotary tool according to my invention.

In FIG. 1 I have shown a rotary tool 10, such as a spinning pot, on a free end of a shaft 1 received with significant all-around clearance in a bore 9 of a tube 3 which surrounds that shaft over a major part of its length and is rotatably journaled in a stationary housing 6 via two ball bearings 4,5. The outer race of ball bearing 5 is held in position by a cover plate 11a; a similar cover plate 11b closes the opposite end of housing 6. The inner bearing races are held in position by respective retaining nuts 21a, 21b. Ball bearing 4 is separated from an internal shoulder of the housing by slightly prestressed Belleville springs 7 designed to eliminate axial play.

On standstill, as well as during high-speed operation, shaft 1 is held substantially centered on the axis of tube 3 and coupled therewith for joint rotation by means of two sets of elastic inserts 2 in the form of soft coil springs peripherally arrayed along the inner tube surface. The elasticity coefficient of these springs is so chosen that, as explained above, the tool 10 including shaft 1 has a critical speed $V_c$ lying substantially below the operating speed $V_o$ at which the tool is rotated by drive means represented only by a belt pulley 12 on an outwardly projecting rear extremity of the tube 3 opposite the tool-supporting end of shaft 1. If desired, the ends of springs 2 could be received in shallow recesses of the tube and shaft surfaces for a more positive entrainment of the tool by the rotating tube.

Figure 2:
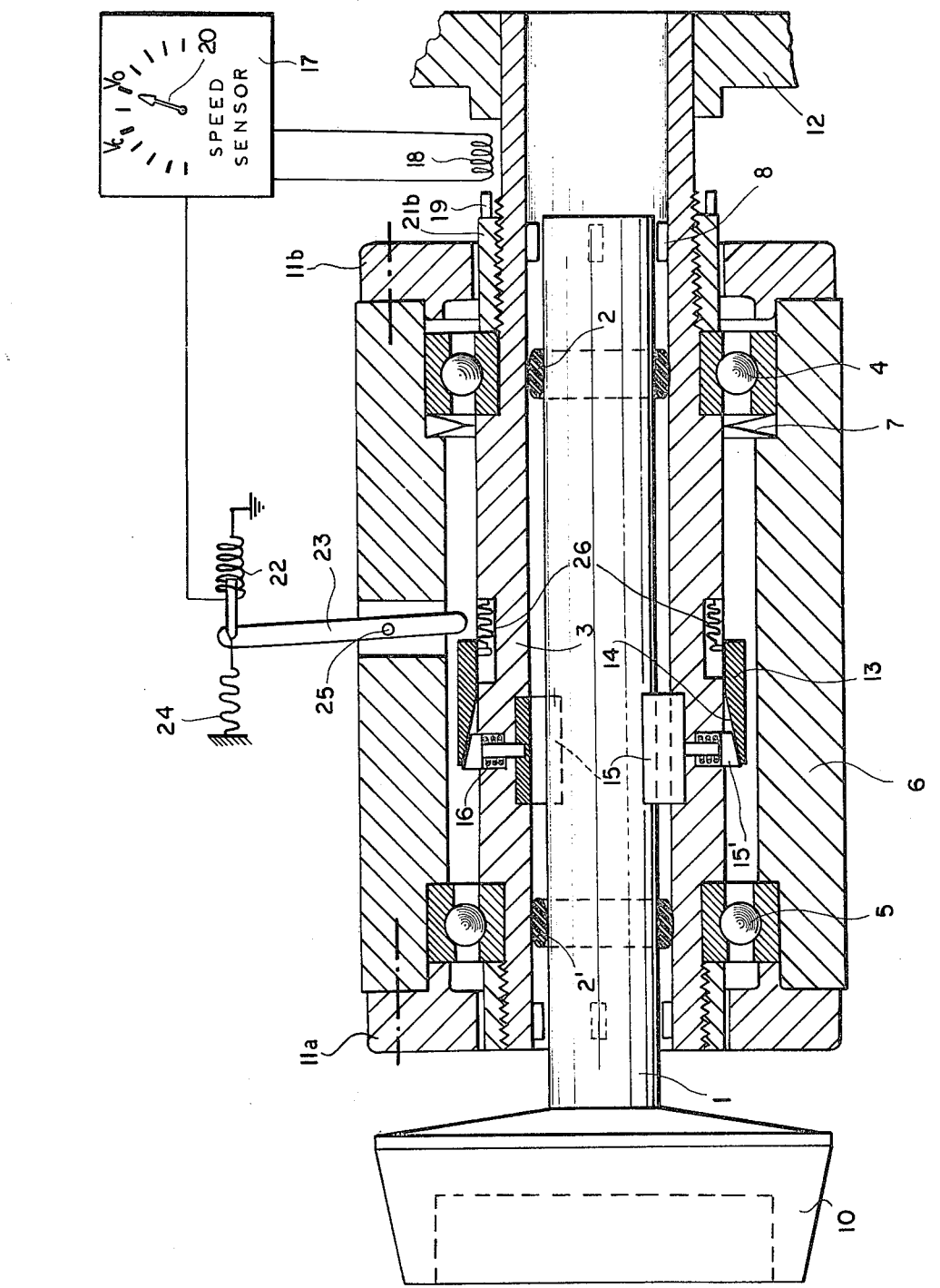
FIG. 2 is a view similar to FIG. 1, illustrating a modification.

In FIG. 2 I have shown a locking mechanism designed to immobilize the shaft 1 with reference to the tube 3 during rotation at and near the critical speed $V_c$. This mechanism comprises a sleeve 13, slidable along the outer periphery of tube 3, with a frustoconical camming surface 14 bearing upon two (or more) segmentally curved shoes 15 seated in radial recesses of tube 3. The shoes 15 are biased radially outward by coil springs 16 which tend to hold their beveled heads 15 in contact with the frustoconical sleeve surface 14. Thus, a leftward shift of the sleeve 13 cams the shoes 15 inward into contact with the tool shaft 1, thereby eliminating the modulus of elasticity of the coupling means (springs 2 of FIG. 1) as a criticality-determining parameter. Such a shift could be brought about manually but in the present instance is controlled automatically by a speed sensor 17 comprising an electromagnetic pick-up coil 18 which coacts with ferromagnetic pins 19 on retaining nut 21b.

Speed sensor 17 is shown to comprise a tachometric indicator 20 sweeping a scale on which the critical speed $V_c$ and the operating speed $V_o$ are marked; speed $V_o$ is seen to be approximately half again as high as speed $V_c$. A nonillustrated switch coupled with indicator 20 energizes a solenoid coil 22 in a speed range in which shaft 1 is to be consolidated with tube 3; the lower limit of that speed range may be at zero or somewhat below $V_c$ while its upper limit lies between $V_c$ and $V_o$. Coil 22, when energized, swings a lever 23 clockwise against the force of a restoring spring 24 about a fulcrum 25 in housing 6, the opposite end of this lever then acting upon the rotating sleeve 13 against the force of several countersunk springs 26. It will be understood that the illustrated locking mechanism is representative of a variety of equivalent constructions.

As further shown in FIG. 2, the supporting springs 2 could be replaced by soft O-rings 2' of natural or synthetic rubber having the required modulus of elasticity for establishing the critical speed $V_c$ well below the operating speed $V_o$. Inserts of either type may, of course, be used with the locking mechanism of FIG. 2.

As further shown in FIGS. 1 and 2, the tube is advantageously provided with internal abutments 8 in the form of peripherally arrayed bosses which surround the ends of shaft 1 but do not normally contact same. The purpose of these abutments is to limit the radial excursions of the shaft ends at speeds lower than $V_o$ in the absence of the aforedescribed locking mechanism or outside the effective range of the latter.

I claim:

1. In a device including a housing, a shaft rotatable in said housing at a high operating speed, a tool carried on a free end of said shaft projecting from said housing, and drive means for rotating said shaft, the combination therewith of a mounting for said shaft comprising:
an elongate tubular element having an axial bore of a diameter substantially exceeding that of said shaft, said element surrounding said shaft over a major part of the length of the latter and terminating ahead of said free end thereof;
two axially spaced bearings rotatably supporting said element in said housing, said element having an extremity opposite said free end projecting from said housing, said extremity being coupled to said drive means; and
elastic coupling means in said bore supporting said shaft in substantially coaxial relationship with said element at a plurality of axially spaced locations for joint rotation while allowing limited radial excursions of said shaft from a coaxial position, said shaft and said tool together constituting a rotary body whose moment of inertia determines together with the modulus of elasticity of said coupling means a normal critical speed lower than the operating speed imparted to said body by said drive means.

2. The combination defined in claim 1 wherein said operating speed is approximately half again as high as said critical shaft speed.

3. The combination defined in claim 1 or 2 wherein said coupling means comprises a plurality of soft coil springs.

4. The combination defined in claim 1 or 2 wherein said coupling means comprises a plurality of soft O-rings.

5. The combination defined in claim 1 or 2, further comprising abutments disposed on the wall of said bore near the ends of said shaft for limiting the radial excursions of said ends, said abutments being normally spaced from said shaft.

6. The combination defined in claim 5 wherein said coupling means inserts comprises disposed axially inwardly of said abutments.

7. The combination defined in claim 1 or 2, further comprising locking means in said bore for relatively immobilizing said shaft and said element at speeds of rotation in the vicinity of said normal critical speed, thereby eliminating said modulus of elasticity as a criticality-determining parameter.

8. The combination defined in claim 7, further comprising speed-sensing means operatively coupled with said drive means for automatically releasing said locking means, after start-up of said drive means with said locking means activated, upon the speed of rotation of said shaft significantly exceeding said normal critical speed.

* * * * *